US004001624B2

United States Statutory Invention Registration [19]

[11] Reg. Number: H1624

Ogden et al.

[45] Published: Jan. 7, 1997

[54] STABILIZER FOR SUBMERGED GASEOUS JETS IN LIQUIDS

[75] Inventors: T. Roger Ogden; Eric W. Hendricks, both of San Diego, Calif.

[73] Assignee: The United States of America as represented by the Secretary of the Navy, Washington, D.C.

[21] Appl. No.: 73,017

[22] Filed: Jun. 2, 1993

[51] Int. Cl.[6] ..... F02M 67/00

[52] U.S. Cl. ..... 261/123; 261/121.1

[58] Field of Search ..... 261/123, 121.1, 261/DIG. 78

[56] References Cited

U.S. PATENT DOCUMENTS

| | | | |
|---|---|---|---|
| 2,645,350 | 7/1953 | Nordstrand | 261/121.1 |
| 3,545,886 | 12/1970 | Chalom | 261/DIG. 78 |
| 3,550,917 | 12/1970 | Cochran | 261/121.1 |
| 3,721,429 | 3/1973 | Young et al. | 261/123 |
| 3,816,515 | 6/1974 | Kelham . | |
| 3,913,899 | 10/1975 | van der Sluys et al. . | |
| 4,076,617 | 2/1978 | Bybel et al. | 261/123 |
| 4,282,172 | 8/1981 | McKnight | 261/123 |
| 4,283,357 | 8/1981 | Sidery | 261/87 |
| 4,297,214 | 10/1981 | Guamaschelli | 261/87 |
| 4,455,166 | 6/1984 | Brancaz et al. . | |
| 4,630,802 | 12/1986 | Frykendahl . | |
| 4,668,632 | 5/1987 | Young et al. | 261/121.1 |
| 4,680,934 | 7/1987 | Short . | |
| 4,863,644 | 9/1989 | Harrington et al. | 261/123 |
| 4,993,691 | 2/1991 | Mousel et al. . | |
| 5,302,325 | 4/1994 | Cheng | 261/DIG. 78 |

OTHER PUBLICATIONS

E. Loth & G. M. Faeth, "Structure of Underexpanded Round Air Jets Submerged in Water", *Int. J. Multiphase Flow*, vol. 15, No. 4, 1989, pp. 589–603.

V. A. Surin, V. N. Evchenko, & V. M. Rubin, "Propagation of a Gas Jet in a Liquid", *Inzhenerno–Fizicheskii Zhurnal*, vol. 45, No. 4, May 1982, pp. 542–554.

D. H. Cho & D. R. Armstrong, "Visualization of Reacting Gas Jets Submerged in Liquids", *Pennsylvania State University/Applied Research Laboratory, State College, Pennsylvania*, 19–20 Nov. 1986.

T. R. Ogden, L. A. Parnell, E. W. Hendricks, and W. M. Schieber, "Shear Flow Control of Gas Jets in Liquids", *AIAA/SAE/ASME/ASEE 28th Joint Propulsion Conference and Exhibit*, 6–8 Jul. 1992, Nashville, TN, 7 pages.

*Primary Examiner*—Charles T. Jordan
*Assistant Examiner*—John R. Hardee
*Attorney, Agent, or Firm*—Harvey Fendelman; Thomas Glenn Keough; Peter A. Lipovsky

[57] ABSTRACT

The invention is a passive control technique effective in eliminating reverse flow instability. The invention preferably includes two flow stabilizers each preferably having a planar face. The flow stabilizers are disposed at an exit end of an injector so that the planar faces oppose each other and diverge in a direction normal to the flow of the gas passing through the injector.

10 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STABILIZER FOR SUBMERGED GASEOUS JETS IN LIQUIDS

STATEMENT OF GOVERNMENT INTEREST

The invention described herein may be manufactured and used by or for the Government of the United States of America for governmental purposes without the payment of any royalties thereon or therefor.

DOCUMENTS INCORPORATED BY REFERENCE

V. A. Surin, V. N. Evenchenko, and V. M. Rubin, "Propagation of a Gas Jet in a Liquid", Inzhenerno-Fizicheskii Zhurnal, V. 45, pp. 452–554 (1983).

E. Loth and G. M. Faeth, "Structure of Underexpanded Round Air Jets Submerged in Water", Int. J. Multiphase Flow, V. 15, pp. 589–603 (1989).

D. H. Cho and D. R. Armstrong, . . . "Visualization of Reacting Jets Submerged in Liquids", ONR Workshop on Closed Liquid Metal Combustion, Nov. 19–20, 1986, Pennsylvania State University/Applied Research Laboratory, State College, Pa.

T. R. Ogden, W. M. Schieber, L. A. Parnell and E. W. Hendricks, "Shear Flow Control of Gas Jets in Liquids", AIAA/SAE/ASME/ASEE, 28th Joint Propulsion Conference, July 6–8, 1992, Nashville, Tenn.

BACKGROUND OF THE INVENTION

1. Field of the Invention

This invention relates generally to the area of fluid flow. In greater particularity the invention relates to controlling the flow of gas injected into a liquid.

2. Description of the Related Art

Gaseous jets submerged in liquids are a feature of many industrial processes such as those, for example, in the chemical, metal and food processing industries as well as the power generation industry. Of particular importance to the United States Navy is liquid metal combustion involving the injection of a gaseous oxidant such as sulfur hexafluoride into a liquid metal fuel such as lithium. The Navy uses liquid metal combustion for compact, self-contained power generators such as those employed in marine propulsion systems. The Stored Chemical Energy Propulsion System (SCEPS) is an example of such a propulsion system.

In liquid metal combustion reactors, it is known that under certain operating conditions erosion of the oxidant injector can occur. Jet instabilities, most likely caused by nonuniform or unstable entrainment of fuel into the jet, permit the injector to be contacted by the corrosive reactants as well as the high temperature liquid metal combustion itself. The injector may eventually be destroyed, resulting in a breach of its containment vessel with loss of power from the propulsion system or even an explosion if liquid lithium contacts water.

In normal operation an oxidant injector is "choked" so that the oxidant gas exits the injector at the speed of sound. Initially, as the oxidant gas passes through the injector passage it is at a low temperature and undissociated, i.e. not very reactive. The high speed of the jet and the low temperature of the gas causes most of the reaction to take place away from the injector. Under these conditions there is little or no attack of the injector.

However, when injecting low-density gas into much higher density liquid, an instability occurs. The instability produces a large-scale disturbance in the jet and causes the injector to be directly exposed to the combustion. The gas becomes partially mixed with the high temperature molten metal bath and reacts rapidly with the injector to cause major injector erosion.

This instability, or what has become known as a "reverse shock" instability of gaseous jets submerged in liquids, was described by the Soviets in 1983. No technique, however, was proposed for its elimination. The Surin article referenced above describes these early observations. A similar instability has been observed by Loth and Faeth in submerged air jets in water. An attempt was made to eliminate this instability, but no success was reported. The Loth and Faeth work is described in their article referenced above.

Due to similarities between non-condensing/non-reacting jets and the reacting jet characteristics of metal combustion, the Navy has investigated nitrogen jets submerged in water. For comparison to rapidly condensing systems, studies of steam injected into water were made.

Both non-reacting and reacting systems are considered vulnerable to the reverse flow effect. Cho studied HCl gas injected into an aqueous solution of $NH_3$ as a visualizable model of a liquid metal combustion process. He observed an effect similar to the reverse flow effect. These observations are recorded in his article incorporated above.

The reverse flow effect occurs throughout a wide range of operating conditions. Two conditions necessary for its existence are a large difference in density between an injected gas and a liquid bath and that the gas jet not be rapidly condensed into the bath. Both of these conditions occur in liquid metal combustion. This is reported in the Ogden article incorporated by reference herein.

In FIG. 1 there is shown a strobed videoframe of a gaseous jet 1 injected into a liquid 2 under choked conditions. This image illustrates the undisturbed condition of gaseous nitrogen as it is injected into water. As can be seen, jet 1 makes a clean exit from injector 3 posing only minimal exposure of the injector to the injected gas.

In FIG. 2 a strobed video image is shown of the onset of reverse flow. The reverse flow phenomenon is characterized by a sudden reversal of gas flow from the direction of injection. In FIG. 2, a large amount of liquid is entrained into the gaseous jet at 4, blocking the free flow of gas jet 1 in the direction of injection. Because the entrained liquid is many times more dense than the injected gas, a large volume of gas collects at 6 behind the heavy liquid barrier at 4 and is channeled back towards injector 3.

Under these conditions, the injected gas begins to envelop the injector exit and as time progresses a more complete envelopment of the injector will occur. A pressure wave accompanies the reverse flow and results in high intensity noise.

SUMMARY OF THE INVENTION

The invention is a passive control technique known to be effective in eliminating reverse flow instability occurring in non-reacting systems. Because of the similarities between the non-reacting jets and the reacting jets of liquid metal combustion, the invention is proposed for use in liquid metal combustion processes as well.

As the reverse flow effect is considered to be attributable to lateral flow perturbations and the development of large-scale turbulent eddies, the invention shields a jet from these perturbations and blocks the development of the eddies, thereby eliminating or substantially reducing the effect.

The invention preferably includes two flow stabilizers each preferably having a planar face. The flow stabilizers are disposed at an exit end of an injector so that the planar faces oppose each other and diverge in a direction normal to the flow of the gas passing through the injector.

OBJECTS OF THE INVENTION

It is an object of this invention to control the flow of a gas injected into a liquid.

A further object of this invention is to substantially impede lateral perturbations of a gaseous jet injected into a liquid.

Another object of this invention is to impede the development of large-scale turbulent eddies which can lead to lateral flow perturbations of a gaseous jet injected into a liquid.

Yet another object of the invention is to eliminate the "reverse shock" or "reverse flow" effect characteristic of the injection of a gaseous jet into a liquid.

Still a further object of this invention is to provide a means of stabilizing submerged gaseous jets in liquids in order to prevent erosion of a utilized injector.

Yet a further object of this invention is to prevent injector erosion in a liquid metal combustion process thereby providing increased performance and survivability of a system utilizing liquid metal combustion as an energy source.

These and other objects of the invention will become more apparent from the ensuing specification when taken together with the drawings.

DESCRIPTION OF THE PREFERRED EMBODIMENT

Reverse flows are caused when a large amount of high-density liquid is swept into a gaseous jet, impeding the flow of the gas. The differences between uninhibited and inhibited flow can be seen in FIGS. 1 and 2, respectively.

Through the use of a simple modification of injection geometry, the amplitude and frequency of reverse flows can be substantially reduced or eliminated. By positioning planar surfaces near the exit end of a utilized injector, parallel to the divergence of a gaseous jet and just external to the jet, a great reduction in the number of reverse flow events is made possible. Positioning the planar stabilizers near the boundary of the jet attenuates the development of the interface instability which produces the reverse flow, and helps prevent the sudden entrainment of a large volume of liquid. The stabilizers also shield the jet from transverse perturbations. The result is a reduction or elimination of the occurrence of reverse flows.

Figure 3A:
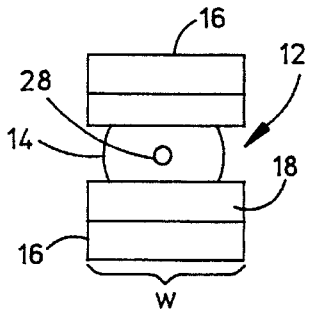
FIGS. 3A and 3B show an end and cross-sectional view, respectively, of an injector with the flow stabilizers of the invention.
Figure 3B:
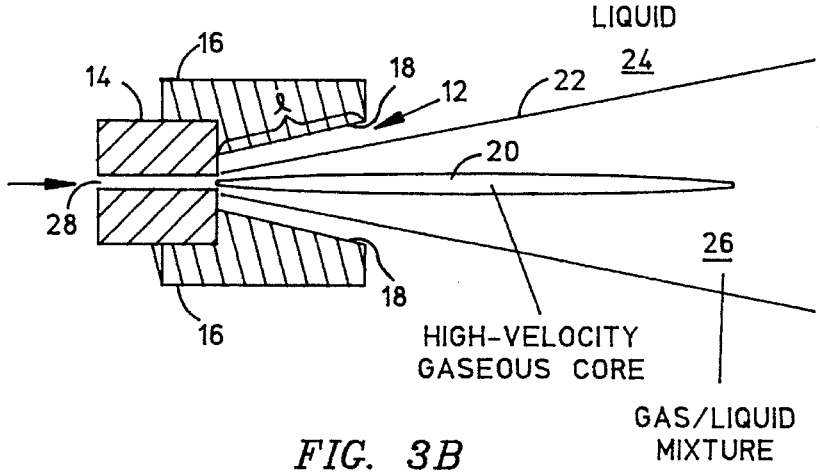

Referring now to FIGS. 3A and 3B, end and cross-sectional views of one implementation of such stabilizers are shown, respectively. At an exit end 12 of a representative injector 14, two flow stabilizers 16 are positioned. The flow stabilizers each have planar faces 18 and are placed on opposing sides of high velocity gaseous jet 20 slightly from boundary layer 22 existing between liquid 24 and gas/liquid mixture 26.

In the representative example of the invention used, injector 14 was machined from brass. Nozzle exit 28 was a right cylindrical tube (Fanno-type) of 2.5 mm diameter. Flow stabilizers 16 were machined from Plexiglas, and fitted and attached to injector 14 as shown. In this demonstration of the invention, nitrogen gas was injected into water.

Best results were obtained when planar surfaces 18 were at least five nozzle exit-diameters in length (1), in this case a minimum of about 1.25 cm, with the surfaces being positioned about one exit diameter 2–3 mm from boundary layer 22. The wedge-shaped stabilizers used in this demonstration were about 2 cm wide (w).

Figure 4:
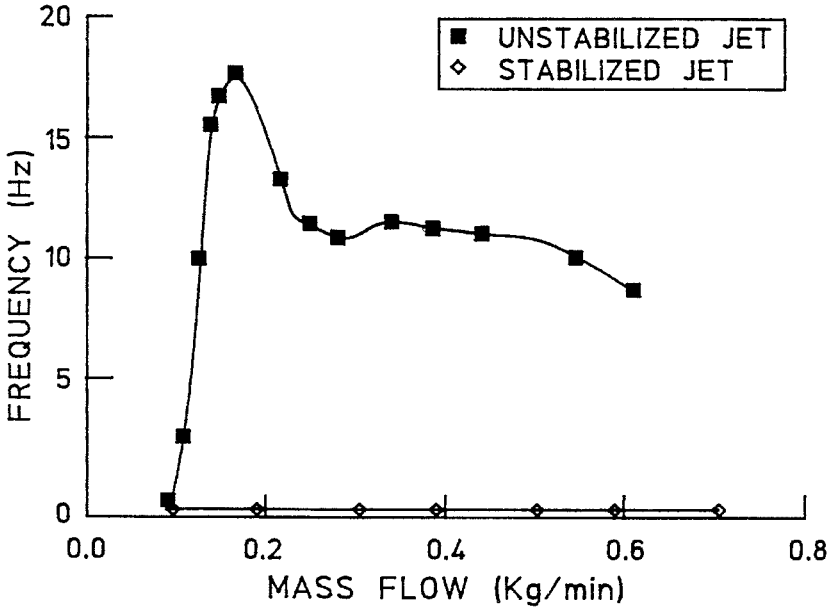
FIG. 4 is a graph of reverse flow frequency versus mass flow rate for a Fanno tube-type nozzle.

In FIG. 4 there is shown a graph of frequency of occurrence of reverse flows versus gas mass flow rate with and without the flow stabilizers of the invention. Without these stabilizers, the frequency of reverse flows is as much as 17–18 times per second at 0.16 kg/minute corresponding to the choke pressure, in this case about two atmospheres. As can be seen, the frequency of occurrence of reverse flow decreases with increasing flow rate and pressure.

Figure 1:
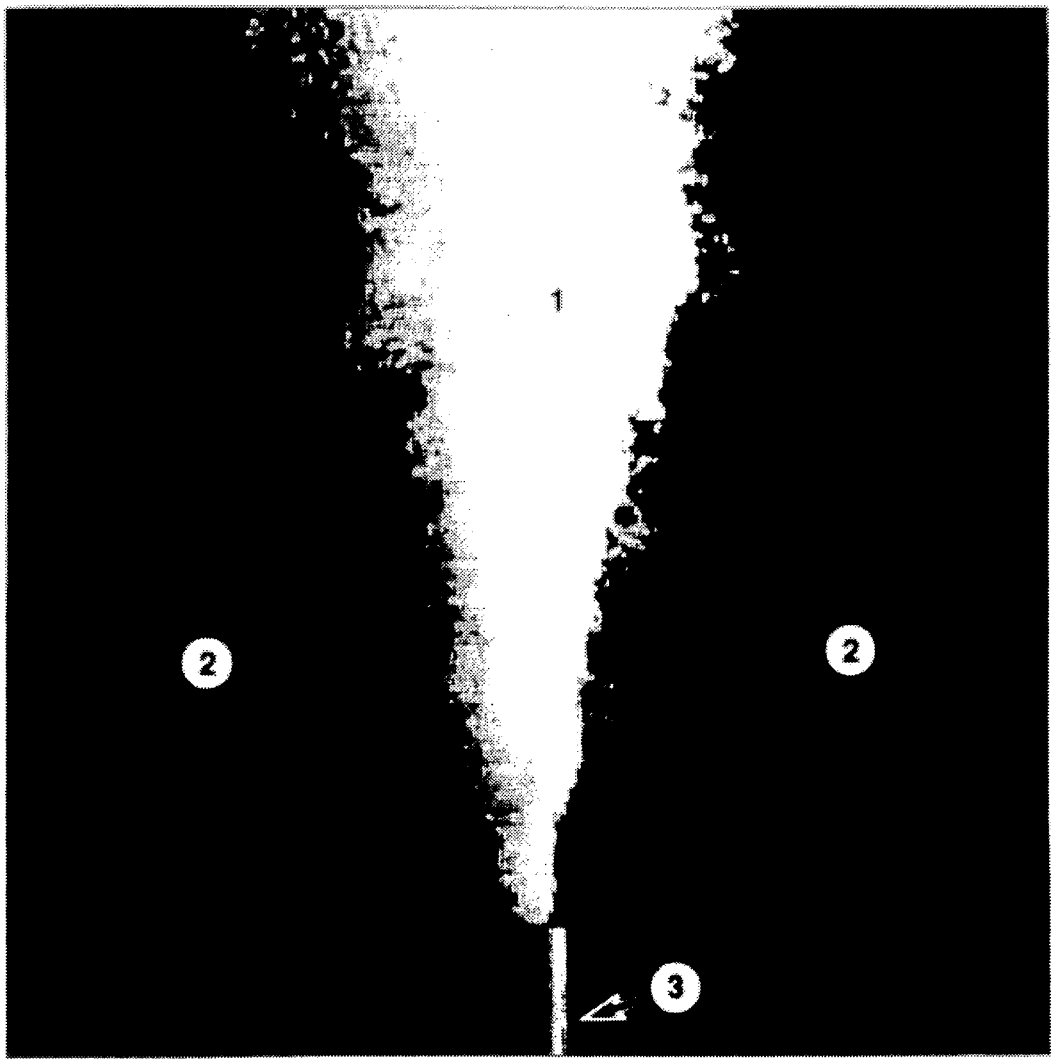
FIG. 1 depicts the injection of nitrogen gas into water under choked conditions. No reverse flow is present in this figure.
Figure 2:
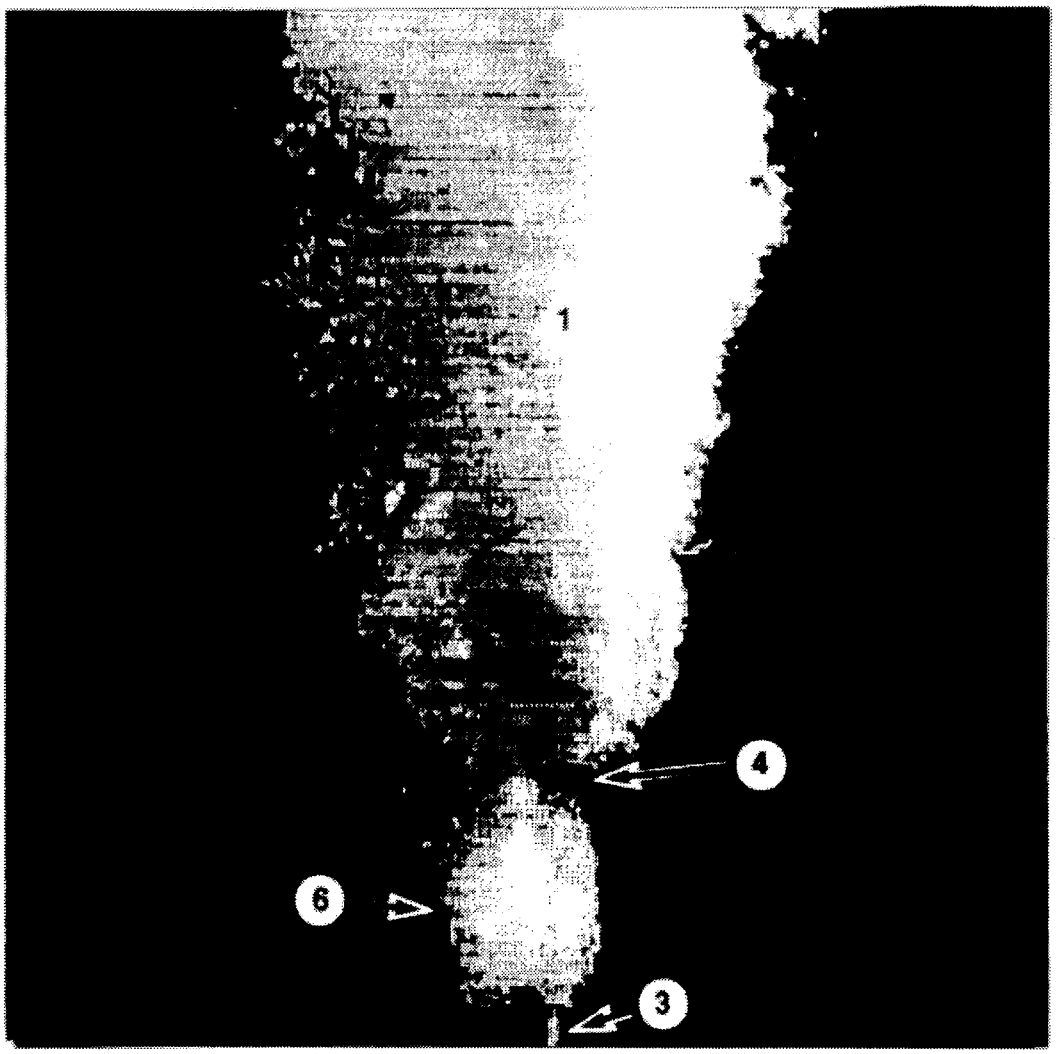
FIG. 2 also shows the injection of nitrogen gas into water under choked conditions. Initiation of reverse flow is apparent in this figure.

With the addition of the flow stabilizers reverse flows were eliminated over a wide range of mass flow rates. The lower line of FIG. 4, representing the frequency of occurrence of reverse flows while utilizing the invention, is offset from zero for visibility. Without using the flow stabilizers, nozzle 14's exit end 12 was enveloped in gaseous jet 20 for as much as 50 percent of the time. When this jet was stabilized, the jet made a clean exit from the injector as shown in FIG. 1.

Though the invention has obvious applications to liquid metal combustion systems, those skilled in the art will realize that it is applicable to other systems. In addition, variations of the stabilizers of the invention are of course possible. For example, it can be envisioned that stabilization may be achieved with only one surface or even with more than two surfaces. Further, stabilizers having other than planar faces may be tried, such as those following the curvature of the liquid-gas/liquid boundary layer.

Obviously, many modifications and variations of the present invention are possible in light of the above teachings. It is therefore to be understood that within the scope of the appended claims the invention may be practiced otherwise than as specifically described.

What is claimed is:

1. An apparatus comprising:

an injector through which a gas flows at approximately the speed of sound into a liquid; and a flow stabilizer having a planar face, said flow stabilizer being disposed at an exit end of said injector so that said planar face diverges in a direction normal to the flow of said gas through said injector, said flow stabilizer for reducing reverse flow of said gas.

2. An apparatus according to claim 1 in which said liquid is a liquid metal.

3. An apparatus of claim 2 in which said liquid metal is lithium.

4. An apparatus according to claim 3 in which said gas is sulfur hexafluoride.

5. An apparatus comprising:

an injector through which a gas flows at approximately the speed of sound into a liquid; and two flow stabilizers each having a planar face, said flow stabilizers being disposed at an exit end of said injector so that said planar faces oppose each other and diverge in a direction normal to the flow of said gas through said injector, said flow stabilizers for reducing reverse flow of said gas.

6. An apparatus according to claim 5 in which said liquid is a liquid metal.

7. An apparatus of claim 6 in which said liquid metal is lithium.

8. An apparatus according to claim 7 in which said gas is sulfur hexafluoride.

9. An apparatus for reducing reverse flow in liquid-metal combustion comprising:

an injector through which a gas flows into a liquid metal thereby creating a boundary layer between said liquid metal and a liquid metal-gas mixture, said injector having a nozzle exit of a diameter here defined as a nozzle exit diameter; and two flow stabilizers for reducing reverse flow of said gas, each flow stabilizer having a planar face with said flow stabilizers being disposed at an exit end of said injector so that said planar faces oppose each other and diverge in a direction normal to the flow of said gas through said injector, said planar faces having a length of at least five nozzle exit diameters and being positioned from said boundary layer a distance of at least one nozzle exit diameter.

10. An apparatus according to claim 9 in which said gas flows at approximately the speed of sound.

* * * * *